(12) United States Patent
Ali et al.

(10) Patent No.: US 11,049,063 B2
(45) Date of Patent: Jun. 29, 2021

(54) ASSET COMMUNICATION HUB

(71) Applicant: MiCasa Technologies LLC, Mill Valley, CA (US)

(72) Inventors: Shubber Ali, Novato, CA (US); James Sheppard, Mill Valley, CA (US)

(73) Assignee: Centriq Technology, Inc., Mill Valley, CA (US)

( * ) Notice: Subject to any disclaimer, the term of this patent is extended or adjusted under 35 U.S.C. 154(b) by 302 days.

(21) Appl. No.: 14/731,141

(22) Filed: Jun. 4, 2015

(65) Prior Publication Data

US 2016/0357876 A1 Dec. 8, 2016

(51) Int. Cl.
*G06F 16/907* (2019.01)
*G06Q 10/08* (2012.01)

(52) U.S. Cl.
CPC ......... *G06Q 10/087* (2013.01); *G06F 16/907* (2019.01)

(58) Field of Classification Search
CPC .................................................. G06F 16/907
See application file for complete search history.

(56) References Cited

U.S. PATENT DOCUMENTS

| | | | |
|---|---|---|---|
| 5,875,430 A | 2/1999 | Koether | |
| 6,003,808 A | 12/1999 | Nguyen et al. | |
| 7,096,193 B1 | 8/2006 | Beaudoin et al. | |
| 7,424,473 B2 | 9/2008 | Orton, III et al. | |
| 7,801,893 B2 | 9/2010 | Gulli' et al. | |
| 8,095,403 B2 | 1/2012 | Price | |
| 8,342,394 B2 | 1/2013 | Sherman et al. | |
| 8,370,216 B2 | 2/2013 | Kessel et al. | |
| 8,438,070 B2 | 5/2013 | Butler | |
| 8,484,181 B2 | 7/2013 | Levin et al. | |
| 8,517,255 B2 | 8/2013 | Sherman et al. | |
| 8,615,450 B1 | 12/2013 | Fanelli | |
| 8,818,876 B2 | 8/2014 | Yu et al. | |
| 8,965,841 B2 | 2/2015 | Wallace | |
| 9,026,563 B2 | 5/2015 | Juillard | |
| 9,177,056 B2 | 11/2015 | Zappacosta et al. | |
| 9,280,558 B1 | 3/2016 | Billings | |

(Continued)

FOREIGN PATENT DOCUMENTS

EP 2573724 A1 3/2013
JP 2001-344528 A 12/2001

(Continued)

OTHER PUBLICATIONS

International Search Report and Written Opinion directed to related International Patent Application No. PCT/US2016/036064, dated Sep. 21, 2016; 10 pages.

(Continued)

*Primary Examiner* — William Spieler
(74) *Attorney, Agent, or Firm* — Sterne, Kessler, Goldstein & Fox P.L.L.C.

(57) ABSTRACT

Disclosed herein are system, method, and computer program product embodiments for establishing communication channels related to assets. An embodiment enables users of home assets such as appliances to share content related to that asset through a centralized clearinghouse of asset content. Aggregated content reduces redundant searches across sources by many users looking for the same content. New data pathways from user to users, manufacturers, and various third parties are established through the connections created in relation to assets.

20 Claims, 9 Drawing Sheets

(56) References Cited

U.S. PATENT DOCUMENTS

| | | | |
|---|---|---|---|
| 9,294,575 B1 | 3/2016 | Cronin | |
| 9,344,499 B2 | 5/2016 | Kessel et al. | |
| 9,361,637 B2 | 6/2016 | Coon et al. | |
| 9,438,678 B2 | 9/2016 | DeSalvo et al. | |
| 9,453,299 B2 | 9/2016 | Park et al. | |
| 9,471,683 B2 | 10/2016 | Zappacosta et al. | |
| 9,519,876 B2 | 12/2016 | Wallace | |
| 9,537,536 B2 | 1/2017 | Kuroyama et al. | |
| 9,600,824 B2 | 3/2017 | Ogaz et al. | |
| 9,621,662 B1 | 4/2017 | Mukherji | |
| 9,736,268 B1 | 8/2017 | Tsay et al. | |
| 9,747,571 B2 | 8/2017 | Ballew et al. | |
| 9,760,851 B2 | 9/2017 | Ballew et al. | |
| 9,898,771 B2 | 2/2018 | Yu et al. | |
| 10,015,060 B2 | 7/2018 | Yamada et al. | |
| 10,021,114 B1 | 7/2018 | Liu et al. | |
| 10,028,454 B2 | 7/2018 | Williams et al. | |
| 10,082,237 B2 | 9/2018 | Crain et al. | |
| 10,210,841 B1 | 2/2019 | Singley et al. | |
| 10,387,807 B2 | 8/2019 | Agarwal et al. | |
| 10,410,224 B1 | 9/2019 | Levanon et al. | |
| 10,489,813 B1 | 11/2019 | De Guia et al. | |
| 10,555,176 B2 | 2/2020 | Idnani et al. | |
| 10,699,316 B2 | 6/2020 | Chen et al. | |
| 10,748,200 B2 | 8/2020 | Lagoni et al. | |
| 10,749,819 B2 | 8/2020 | Zappacosta et al. | |
| 10,755,331 B2 | 8/2020 | Zappacosta et al. | |
| 10,867,281 B2 | 12/2020 | Agarwal et al. | |
| 10,902,358 B2 | 1/2021 | Agarwal et al. | |
| 10,904,028 B2 | 1/2021 | Jang et al. | |
| 2002/0032626 A1 | 3/2002 | Dewolf et al. | |
| 2002/0107716 A1 | 8/2002 | Callahan et al. | |
| 2002/0143564 A1 | 10/2002 | Webb et al. | |
| 2004/0019534 A1 | 1/2004 | Callahan et al. | |
| 2004/0019609 A1 | 1/2004 | Orton et al. | |
| 2004/0103037 A1 | 5/2004 | Wetmore et al. | |
| 2004/0155109 A1 | 8/2004 | Kenney et al. | |
| 2007/0033108 A1 | 2/2007 | Luhr | |
| 2008/0313007 A1 | 12/2008 | Callahan et al. | |
| 2012/0047082 A1 | 2/2012 | Bodrozic | |
| 2012/0179727 A1 | 7/2012 | Esser | |
| 2012/0239581 A1 | 9/2012 | Mosher | |
| 2013/0304612 A1 | 11/2013 | Wohlstadter et al. | |
| 2014/0229433 A1 | 8/2014 | Nakajima et al. | |
| 2015/0095196 A1 | 4/2015 | Burks et al. | |
| 2016/0057949 A1 | 3/2016 | Williams et al. | |
| 2017/0323383 A1 | 11/2017 | Thorne | |
| 2019/0199859 A1 | 6/2019 | Klemm et al. | |
| 2020/0334616 A1 | 10/2020 | Qiu et al. | |
| 2021/0019690 A1 | 1/2021 | Gordenker et al. | |
| 2021/0019796 A1 | 1/2021 | Litvak et al. | |
| 2021/0021704 A1 | 1/2021 | Arutyunyan et al. | |
| 2021/0068068 A1 | 3/2021 | Lee | |

FOREIGN PATENT DOCUMENTS

| | | |
|---|---|---|
| JP | 2002-140388 A | 5/2002 |
| JP | 2004-110269 A | 4/2004 |
| WO | WO 2001/011530 A1 | 2/2001 |
| WO | WO 2005/096738 A2 | 10/2005 |
| WO | WO 2012/024453 A1 | 2/2012 |

OTHER PUBLICATIONS

HomeZada, "Home Maintenance," http://www.homezada.com/homeowners/home-inventory, 2015; 3 pages.

POJO Software, "Home Maintenance," http://www.pojosoft.com/help/HM/iphone/v2/page2/page2.html, 2010; 6 pages.

POJO Software, "Home Maintenance," http://www.pojosoft.com/help/HM/iphone/v2/page3/page3.html, 2010; 4 pages.

POJO Software, "Home Maintenance," http://www.pojosoft.com/help/HM/iphone/v2/page5/page5.html, 2010; 4 pages.

Raven River Media, "Home Maintenance Manager," http://www.ravenrivermedia.com/Homemanager.html, last accessed Jun. 4, 2015; 2 pages.

Implore Technologies, LLC, "Homespot," http://Homespothq.com/Home/Features, 2015; 3 pages.

Pro Home Manager, "Pro Home Manager—Home Inventory Card File," http://prohomemanager.com/FeaturesSub1.asp, 2015; 1 page.

Office Action for Japanese Application No. 2017-560998, Japanese Patent Office, dated Dec. 19, 2019; 11 pages.

ASSET COMMUNICATION HUB

FIELD

Embodiments generally relate to establishing communication channels related to assets.

BACKGROUND

A typical home has many home assets. Home assets may include, for example, household appliances such as a dishwasher, refrigerator, or coffee maker, major home systems and equipment such as HVAC systems or water heaters, home electronics such as a television or a stereo, home building materials such as flooring or paint, or even landscape items such as a tree or plant in or near a home. Each of these assets has an associated maintenance schedule, warranty information, repair information, parts and consumables, user tips and techniques, and many types of other information related to it. Keeping track of all of this data is difficult for most homeowners to do manually. Additionally, users of home assets may wish to share information related to home assets or discuss other aspects of an asset.

Previous attempts to address these and other problems include simple home asset tracking systems. These approaches have a local database to track information related to home assets but require a user to enter in all the data for a given home asset. Other users with the same or similar asset must then also manually enter all of the same information. The process of manual data entry is an arduous one at best, and incomplete or inaccurate at worst. Furthermore, such local systems do not provide any functionality that a paper based system might not. For example, a homeowner could have a notebook where they copy down all information about home assets. These local asset tracking systems provide little advantage over a paper based system.

BRIEF DESCRIPTION OF THE DRAWINGS

The accompanying drawings are included to provide further understanding, are incorporated in and constitute a part of this specification, and illustrate embodiments that, together with the description, serve to explain the principles of the technology.

Figure 1:
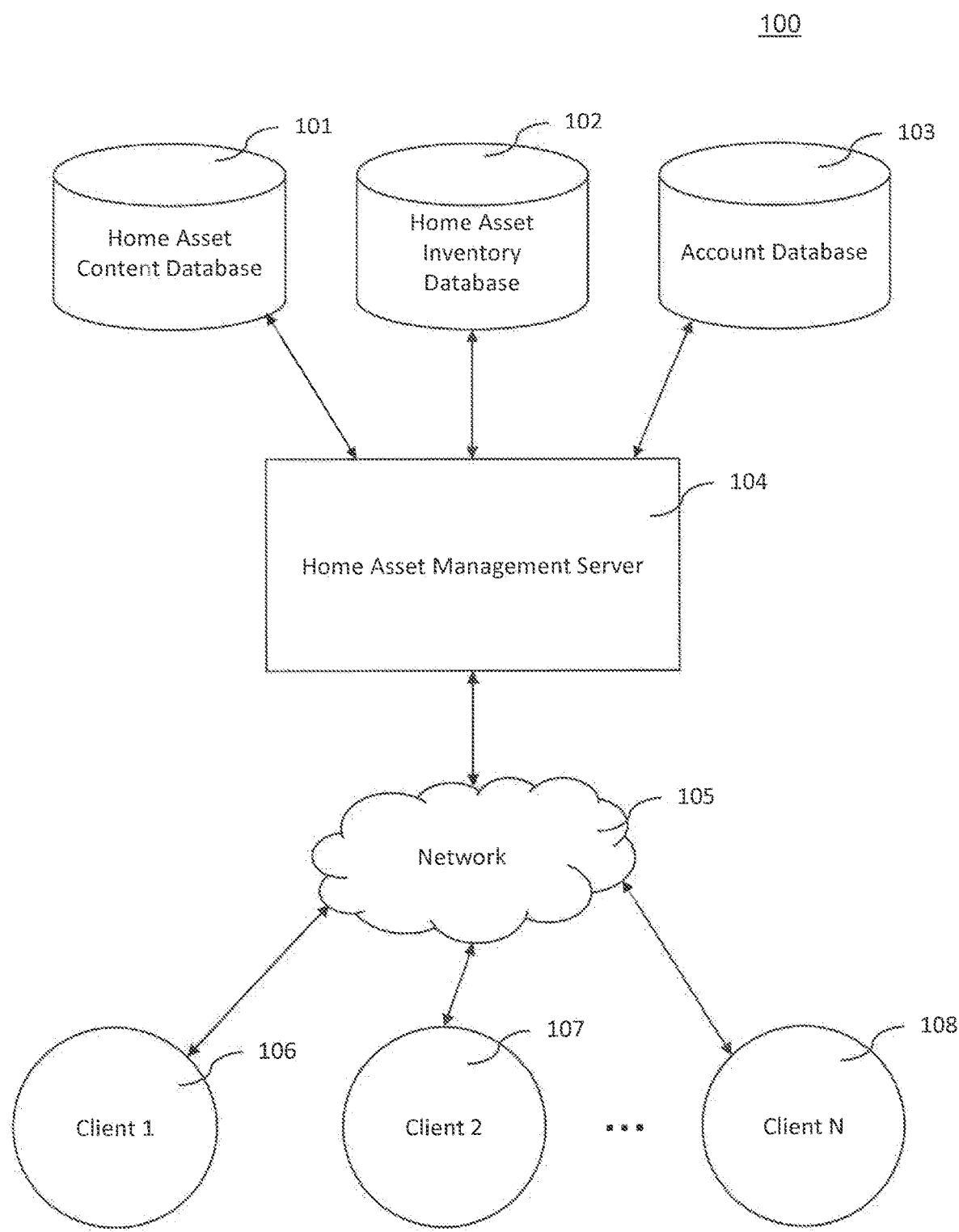
FIG. 1 illustrates a view of an embodiment of the home asset management system.

In the drawings, the left-most digit(s) of a reference number generally identifies the drawing in which the reference number first appears.

DETAILED DESCRIPTION

Provided herein are system, method and/or computer program product embodiments, and/or combinations and sub-combinations thereof, for managing home assets.

FIG. 1 illustrates an embodiment of a home asset management system. Embodiments are described, by way of example only, with reference to a home asset management system although embodiments are equally applicable to other non-home contexts as well. Home asset content database 101 contains content related to home assets. Home assets may include, for example, household appliances such as a dishwasher or a refrigerator, major home appliances and equipment such as HVAC systems or water heaters, home electronics such as a television or a stereo, home building materials such as flooring or paint, or even a tree or plant in or near a home. Content related to home assets may include user manuals, how-to videos, maintenance history, maintenance schedule, notes, purchase documents, warranty information, or any other content related to a home asset. Home asset inventory database 102 contains an inventory record for home. An inventory record contains a list of all spaces and assets in a home. Spaces in a home include rooms, indoor spaces, and outdoor spaces related to a home. Each asset in the home asset inventory is linked to an asset in the home asset content database. Client accounts are housed in client account database 103. Client accounts may be associated with zero or more home asset inventories in the home asset inventory database. Although presented as three separate databases, databases 101-103 may be implemented in one or many separate databases. Database as used herein refers to any method of storing data, including persistent relational data stores, persistent document stores, or any kind of non-persistent data store in memory.

Home asset management server 104 contains one or more computing systems. Home asset management server 104 is the primary server platform for the home asset management system, although any aspect of computation or storage may takes place within databases 101-103, client devices 106-108, or any other ancillary computing devices. Home asset management server is connected to client devices 106-108 through a network 105 such as the internet. Network 105 may be any type of network capable of transmitting information either wired or wireless. Client devices 106-108 may be any type of computing platform, such as but not limited to a smartphone, a tablet computer, a laptop computer, a desktop computer, a web browser, or any other computing platform. Users may interact with client devices 106-108 to access the home asset management system.

Figure 2:
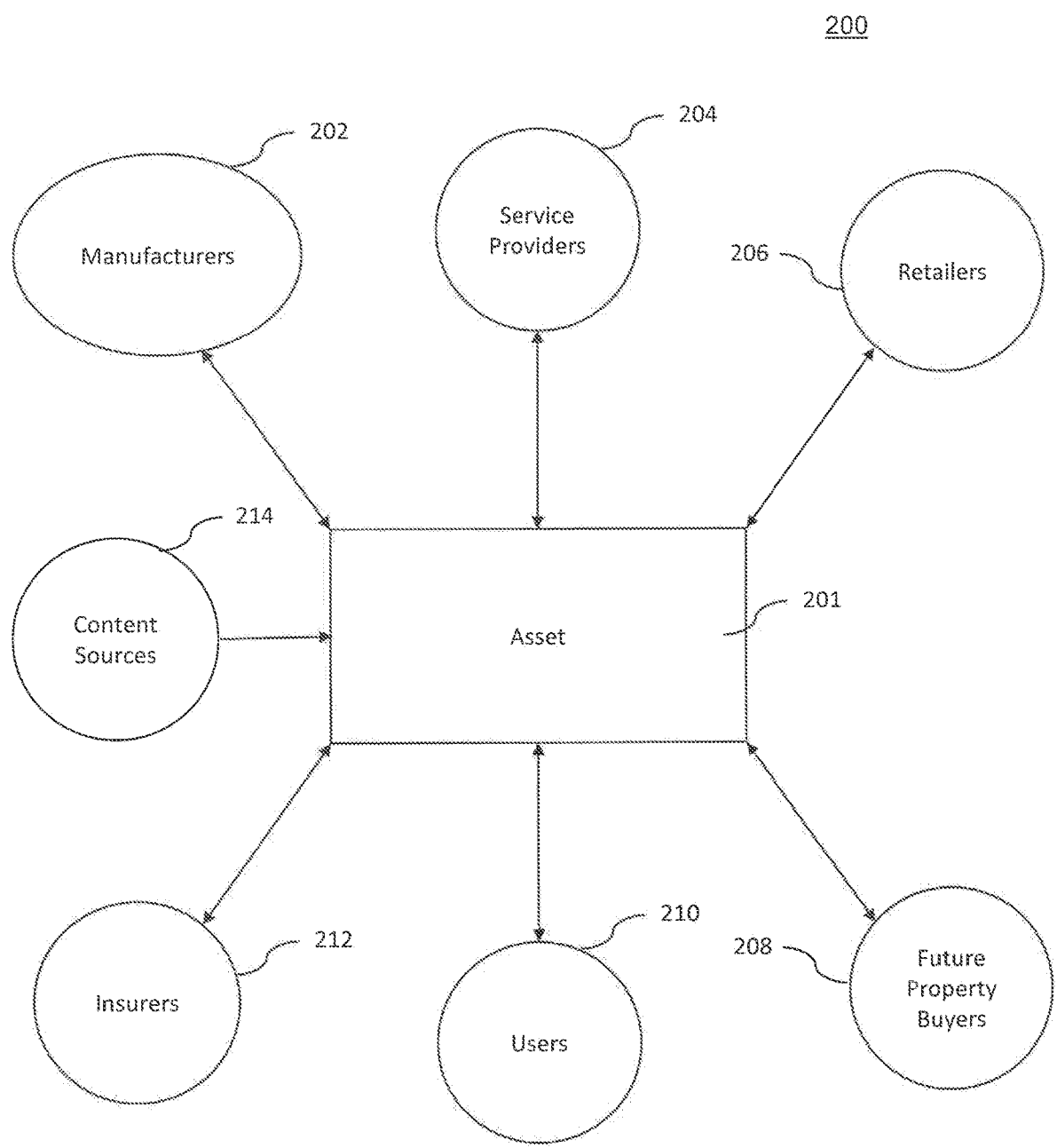
FIG. 2 illustrates the data flow surrounding an asset instance or group of asset instances.

FIG. 2 illustrates the data flow surrounding an asset instance or group of asset instances. In this example, asset 201 acts as a central clearinghouse for content related to the asset. By storing one copy of all content related to the asset, each individual user does not need to search the various content sources individually. This reduces redundancy searches across sources by many users looking for the same information. An asset instance, or instance of an asset, is an instance of a representation of an asset. Data is shared between entities 202-212 through an instance of a home asset 201 or a group of home assets in a home asset inventory database. Manufacturers 202 may provide maintenance plans, information regarding parts and consumables, support information, instruction manuals, care and use guides, product manuals, warranty status, recall notices, and rebate information to the asset 201. Manufacturers may also provide any other information relevant to a home asset including demonstration or training videos. Some information is static or rarely updated such as instruction manuals or maintenance plans. Other information is updated frequently or in real-time such as warranty status or recall notices. Manufacturers may supply this information in any manner, including but not limited to providing an API to supply information, making information available on a website, or by mailing hard copies of information. Manufacturers may also passively provide the information to the public which is then acquired by the home asset management system. For example, a manufacturer may make available a user manual on a publicly accessible website which is then crawled by the home asset management system. All information received from the manufacturer 202 is related to the asset instance or group of asset instances 200.

The home asset management system also provides information to the manufacturers 202 through asset 201. This information may include but is not limited to product registration information, performance and service history, user community insights, real-time net promoter score information, or offer requests. Some of this information is provided by a client account such as performance history or product registration information. A performance history is a history of the asset's maintenance or other performance metrics. Product registration information may include personal identifying information for the client account or user along with an identifier for the home asset. Some information provided to manufacturers 202 is provided by the home asset management system. For example, user community insights and net promoter score information is gathered by the home asset management system and provided to the home asset manufacturer 202. All information sent to the manufacturer 202 is related to the asset instance or group of asset instances 200.

Another group that interfaces with the home asset management system through the home asset 201 is service providers 204. Services providers 204 may be maintenance providers, repairmen, handy-men, field service technicians, laborers, or any other entity that provides services regarding a home asset. These service providers may receive from the home asset management system, for example, make and model information, part numbers, consumables bill of materials, age of the asset, service history of the asset, a user or repair manual for the asset, or any other information stored in the home asset management system regarding an asset. Service providers 204 may receive this information on demand, such as before a service call, or may be provided with regular updates to this information such as regular updates to the performance or service history of the asset. Providing service providers 204 with asset information prior to a service call may save time and money by ensuring the service provider knows what parts or tools to bring to a service call based on the make, model and age of the asset. Another example is that a maintenance history is useful to understand what maintenance tasks may need to be performed on the asset.

Retailers 206 may provide a point-of-sale purchase receipt or warranty information to the home asset management system through asset 201. This information may be pushed from the retailed to the home asset management system by an API or may be manually entered. The home asset management system may provide to the retailer a home asset inventory or a list of offer requests. The retailer may use a home asset inventory to be able to match a specific offer, for example excess inventory of appliances to a customer, based on attributes of the existing asset model. Continuing the example, an asset such as a clothes washing machine could be nearing the end of its expected useful life and the retailer could offer a replacement that fits the same physical dimensions, to ensure it fits in the cabinet as the current asset does. Offer requests are requests made by a user to receive offers for a particular home asset. For example if a user wants to purchase a new dishwasher they can submit a request to multiple retailers to find the best price.

Future property buyers 208 also may interact with home asset 201. A future property buyer 208 may receive warranty information, product manuals, instructional videos, maintenance histories, service histories, or preferred repairman contact information for assets of a home they purchase. Future property buyers may also receive any other information or content stored in the home asset management system related to the instances of home assets in the home that they purchase. Future property buyers 208 may provide new registration information to re-register a home asset instance when they purchase a home. They may also supply updated ownership information regarding an asset that may be used by any other aspect of the home asset management system.

Other users 210 also share information through home asset 201. This sharing is referred to as the community aspect of the home asset management system. Users may share content and other information about a particular type, model, or brand of home asset. Heavy users who are highly knowledgeable and experienced in deriving optimum performance from assets become a resource for lighter users. The content and information they may share includes but is not limited to videos, questions and answers, reviews, or general discussion in a forum context. Other users 210 may both provide and consume this content surrounding home asset 201. Some embodiments include community features for sharing content among users with the same or similar home assets. Community features may include an online forum or other content sharing methods. Communities may be organized around specific models of assets or asset categories such as asset type or asset manufacturer. A user may subscribe to any, all, or none of the asset communities associated with any asset in their inventory. All asset communities may be presented in a single interface in the client application or each community may be presented in a separate interface. Users may post any of their personal content to a community associated with an asset. The utility of each communication within the community is voted on by users, elevating the most useful contributions to become more visible to users.

Insurers 212 receive from the home asset management system value of home assets, value of property contents, and evidence of maintenance. In exchange insurers may provide an analysis of insurance coverage for a particular user or home based on this information. Evidence of maintenance may be any evidence sufficient to demonstrate that a maintenance task was performed. Examples of evidence include receipt of payment to a service provider or a photograph showing the maintenance was performed. For example if a home owner cleans a home's gutters, the homeowner may take one or more photos showing the gutters are clean to serve as evidence. Evidence of maintenance may optionally be digitally signed for further proof the maintenance was performed. Insurers may use evidence of maintenance to set insurance rates. For example, proof that a homeowner performs all recommended maintenance on a home and the assets in a home may lead to a lower cost of insurance for the homeowner. Insurers may also use knowledge of the home assets in a home to establish how much insurance coverage a homeowner needs.

The asset 201 may include content from various sources 214. Content sources may be internet content sources such as video sharing websites, product or service review websites, how-to websites, retailer websites, or any other online source of content related to an asset. One example of a video sharing website is YouTube™. One example of a how-to website is WikiHow™. Retailer websites may be for retailers of assets such as but not limited to Amazon™, Home Depot™, or Lowes™. In some embodiments, home asset management server may programmatically gather content from the various internet content sources 214. In some embodiments, a person may manually gather and curate content from content sources 214. All content is stored in the home asset content database and associated with any relevant home assets in the home asset content database.

By way of nonlimiting example, content that asset 201 may include are asset manufacturer, asset model number, asset age, user manual document, care & maintenance document, maintenance schedule, maintenance tasks, repair and replacement parts, consumables identifiers, "how to" videos on use, maintenance and repair, "how to" instructions in written form, user comments from retail review sites, warranty info, safety or consumer recall info, curated user-generated video comments or notes, and usage tips and tricks from the manufacturer, other users, or trade professionals.

Figure 3:
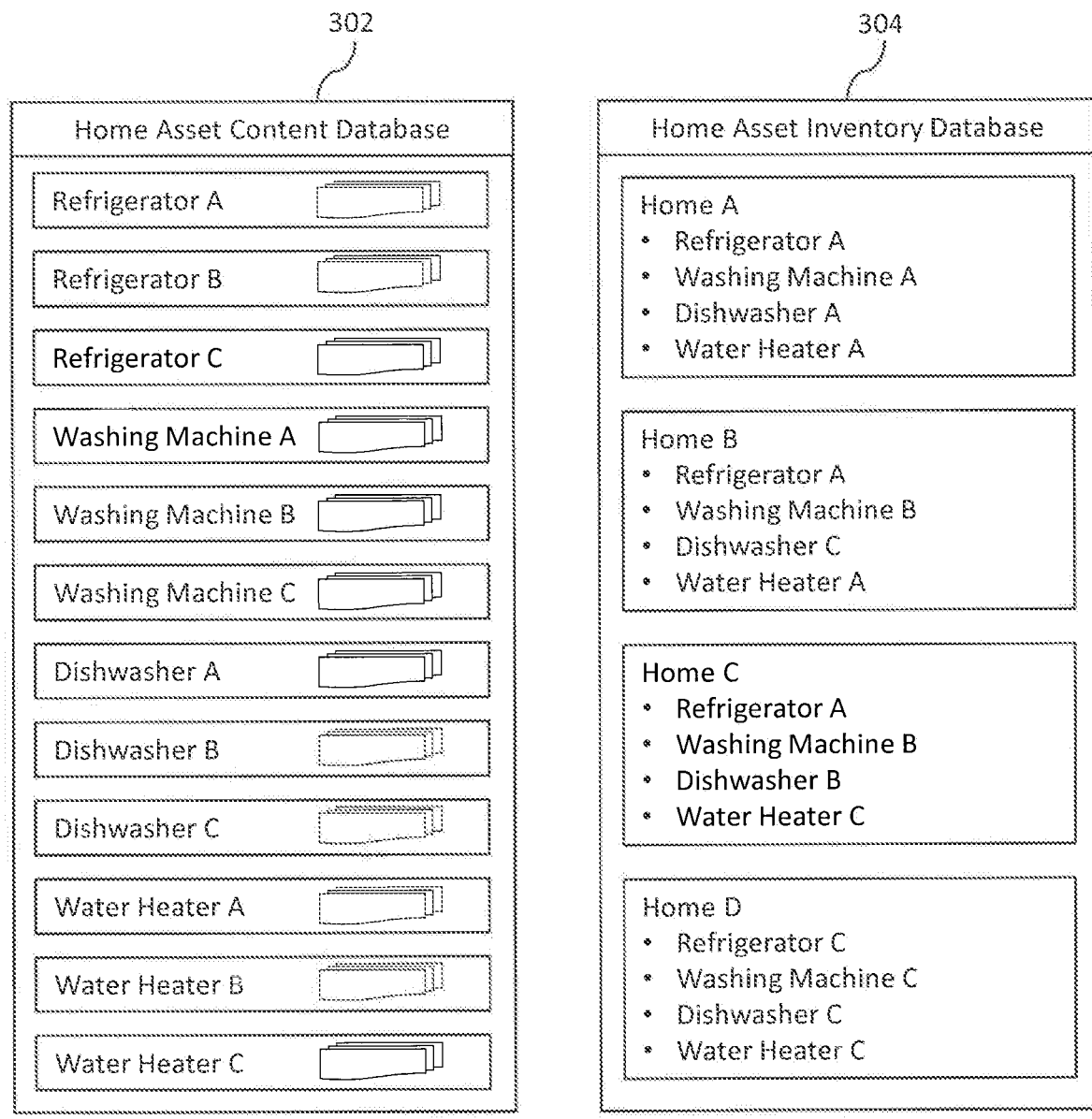
FIG. 3 illustrates in more detail the contents and relationship between the home asset content database and the home asset inventory database.

FIG. 3 illustrates in more detail the contents of the home asset content database 302 and home asset inventory database 304. Home asset content database contains records for various home assets. Illustrated are three different models of refrigerator, washing machine, dishwasher, and water heater. Every make and model has a separate record, although some may share common content, such as closely related models sharing a user manual. Each record contains various content from various sources. Examples of content that may be stored in the home asset content database include user manuals, maintenance templates, how-to videos, usage tips, maintenance tips, reviews, replacement part numbers, or any other content relevant to a home asset. All content is optional and only content relevant to a given asset will be included in the database. Asset records in the home asset content database may be organized in any way to ensure efficient access and retrieval of information. For example assets may be categorized by manufacturer, brand, type, usage scenario, or any other organizational structure.

A user may add personal content associated with their instance of a particular asset. Personal content may be either public or private. Public content is accessible to all other users with similar assets. Private content is only available to the user who created it. For example, the user may record and attach video content to the asset. Examples of video content may include a "how to" video demonstrating use, maintenance, or repair of the asset. It can then be shared with other users of that asset model as public content or kept as private content.

Home asset inventory database 304 contains a record for every inventory. A typical usage is one inventory per home, although alternative embodiments may employ multiple inventories per home. An inventory record contains a list of all assets in a home. These assets are also present in the home asset content database 302. For example, in Home A, Refrigerator A is also found in the home asset content database 302, and so on. The home asset inventory database also optionally contains personal home asset content, separate from the content stored in the home asset content database. The difference is that personal home asset content is limited to a single inventory, while home asset content in the home asset content database 302 is accessible to all inventory records which reference it. For example, a user may record a video showing the location of the home's primary gas shut-off valve for the asset of a stove in the user's home for emergency purposes. This content is specific to that user only so it is stored in the home asset inventory database. However, if the manufacturer supplied a user manual for the same stove that may be available in the home asset content database 302. To the extent that the content may be useful to other users, the user may choose to make the video public so that other users with the same or similar stove may also see the video.

Figure 4:
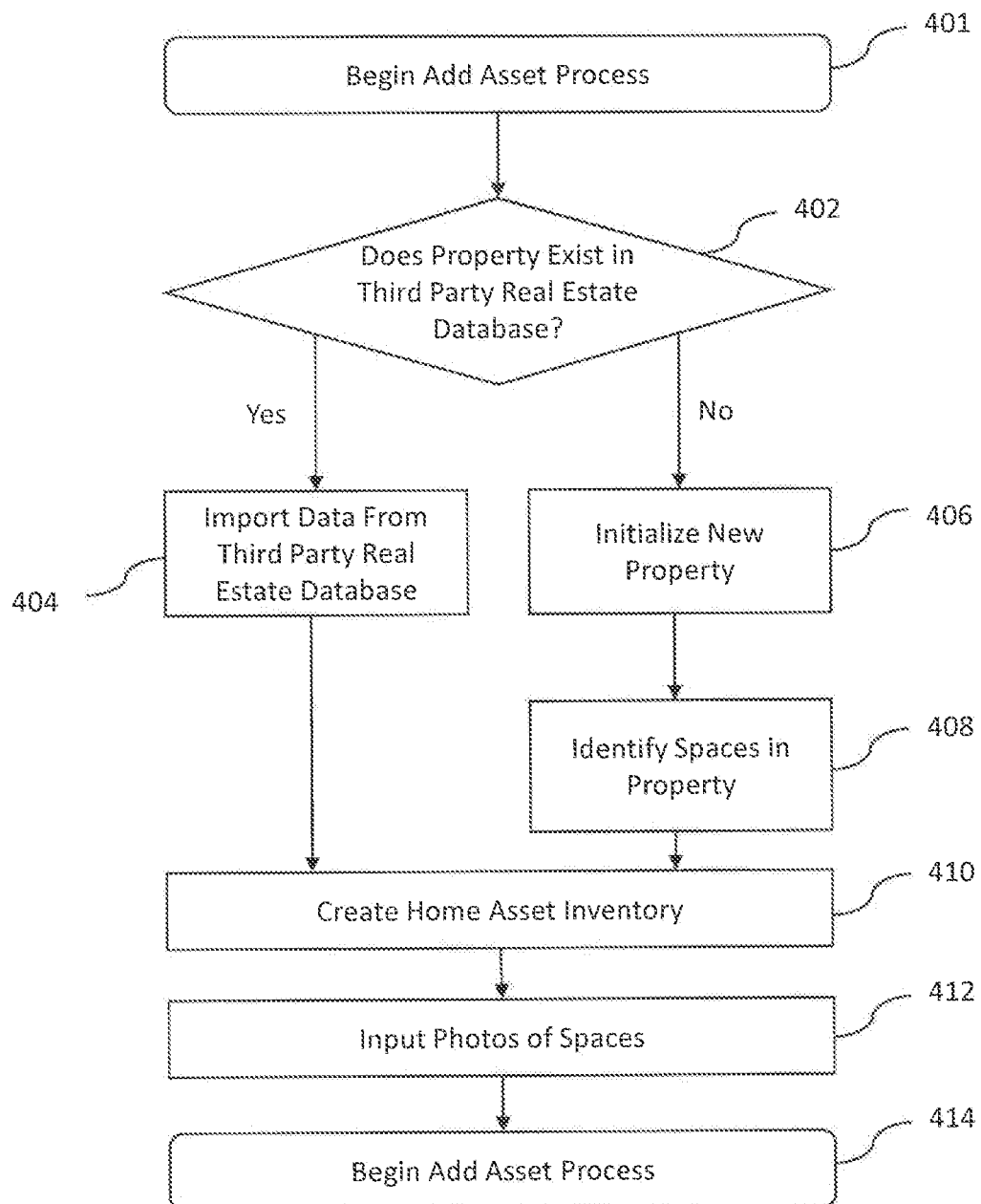
FIG. 4 illustrates a flowchart of the process of creating a new home asset inventory record.

FIG. 4 illustrates the process of cataloging a personal asset inventory in one embodiment. The process is initiated by a user in step 401 by the user providing some identifying information about the home. A user may refer to any person who is using the home asset management system to catalog the content of a home. Examples of a user include a home owner, a home asset installer, a home builder, a home inspector, a realtor, or any other party who is cataloging the contents of a home. In step 402, the home asset management system searches one or more third party real estate databases for the home. If the home is found in a third party real estate database, data may be imported from third party real estate content databases in step 404. Imported data may include the number and type of rooms in the property in addition to other identifying information.

If the home is not found or the user chooses not to import data, the user initializes a new property in step 406. This creates a template based on the identifying information provided in step 400. Then, in step 408, the user identifies the specific rooms and spaces in their property. A room is one type of space. Examples of spaces in a property include but are not limited to kitchens, living rooms, bedrooms, yards, gardens, decks, pools, patios, garages, attics, basements, etc. In step 410, the system creates a digital representation of the user's property with the data gathered in steps 400-408 in the home asset inventory database. The system includes placeholders for each room and the assets in it. In step 412, the user may optionally input a photo of each space to serve as the personalized space identifier or header. The user continues in step 414 with the add asset process described in FIG. 5.

Figure 5:
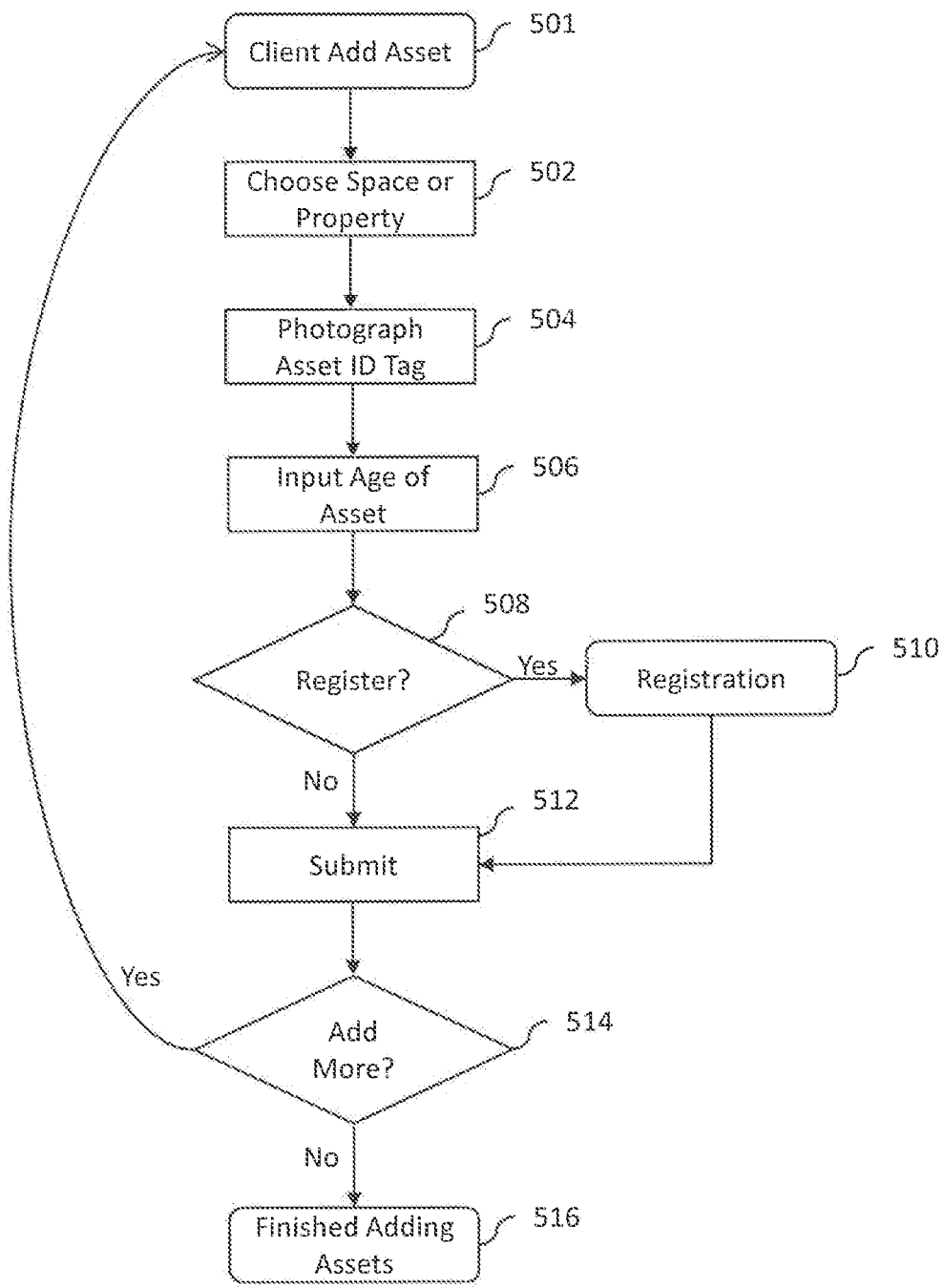
FIG. 5 illustrates a flowchart of the client side process of adding an asset.

FIG. 5 describes the steps a user takes on the client side to add all assets in a home. A user may refer to any person who is using the home asset management system to catalog the content of a home. First in step 501 the user initiates the add asset process. In step 502 the user indicates the space or room the asset resides in. If no space or room is appropriate the user may add the asset to the home asset inventory without associating it with a particular space. For example, the exterior paint used is one type of home asset that a user may want to add to a home inventory that is not associated with one particular room or space within that home. In that case the user only identifies a property to add the asset to.

In step 504 the user may upload a photograph of an asset identification tag. One type of asset identification to may be the asset nameplate that may be associated with the asset. The asset nameplate is the label affixed by the manufacturer to some assets containing the model number, serial number and any safety certifications. If the asset does have a nameplate, the user then takes a photo of the nameplate and uploads it to the asset management system. For assets that do not have an asset identification tag, the user may manually enter the proper data in step 504 or may photograph a combination of information that sufficiently identifies the asset, including the purchase receipt, asset model number or cover of the user manual.

In step 506 the user is asked to input the age of an asset. Age may be entered as a single value such as 2 years or range such as 2-5 years. Age may also be entered as a date of manufacturer or acquisition from which the age of asset may be calculated. Alternatively or in addition, the age of an asset may be gathered from the asset's manufacturer in response to providing the asset manufacturer with information from the asset nameplate. For example, an asset manufacturer may be able to determine the asset's age based on a serial number.

At step 508 the user is presented with an option to register the asset with the asset's manufacturer. Registration involves sending certain identifying information to the asset manufacturer in step 510. The product registration process is carried out by the product registration module described in more detail below.

The user is then prompted to save the asset in step 512 whether or not the user chose to register the home asset. The user is then asked whether they want to add more assets in step 514. If the user indicates they do have more assets to enter, the process repeats again at step 500. If the user indicates they do not have more assets to enter the client side process is complete.

Figure 6:
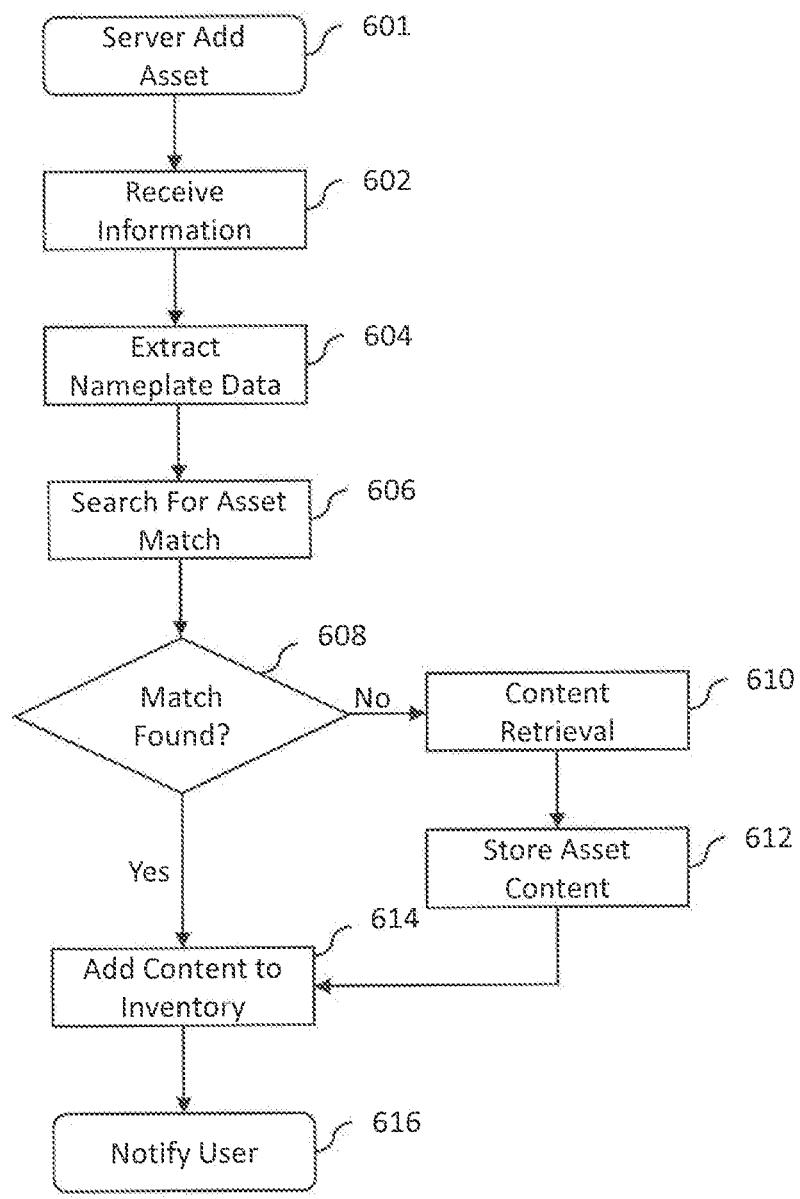
FIG. 6 illustrates a flowchart of the server side process of adding an asset.

When the user submits a newly entered home asset in step 512, the server side portion of the asset adding process illustrated in FIG. 6 is initiated. The server side process is initiated in step 601. At step 602, the home asset management server receives the nameplate and other information submitted by the client in step 512. The Workflow Management Console (WMC) receives asset nameplate photos in step 604 and extracts relevant information about the asset from the photo. The extraction process may be manually done by a WMC operator or automatically done by optical character recognition software. The relevant information may include the asset, model, category, manufacturer, serial number, or any other identifying information. Extracted data is stored in the home asset inventory database.

In step 606 the home asset management system searches through existing assets in the home asset content database for a match on the asset model. If a match is not found, content is retrieved in step 610. Content retrieval may be performed manually by a WMC operator or automatically by software. Such content may be acquired from publicly available resources on a manufacturer's website, or otherwise acquired from public or non-public sources. Content may be in the form of text, photos, files, videos, or any other type of content. Content may include information from manufacturers such as user manuals, troubleshooting guides, FAQs, maintenance schedules, or the like. Content may also come from third party sources such as how-to videos, product reviews, professional reviews, blogs, internet forums, or the like. All content is parsed, organized, and stored in the home asset content database in step 612 for use by all other users of that asset model.

In step 614 the asset is added to the home asset inventory with references or pointers to the corresponding data in the home asset content database either found in step 608 or recently gathered in steps 610-612. Once the asset model content match process is complete, a notification is sent to the user that the content for their asset, associated to the nameplate they submitted, is complete and registered against their specific asset record in step 616. The content may be pushed to the device for local use or maintained on the server for online use.

Figure 7:
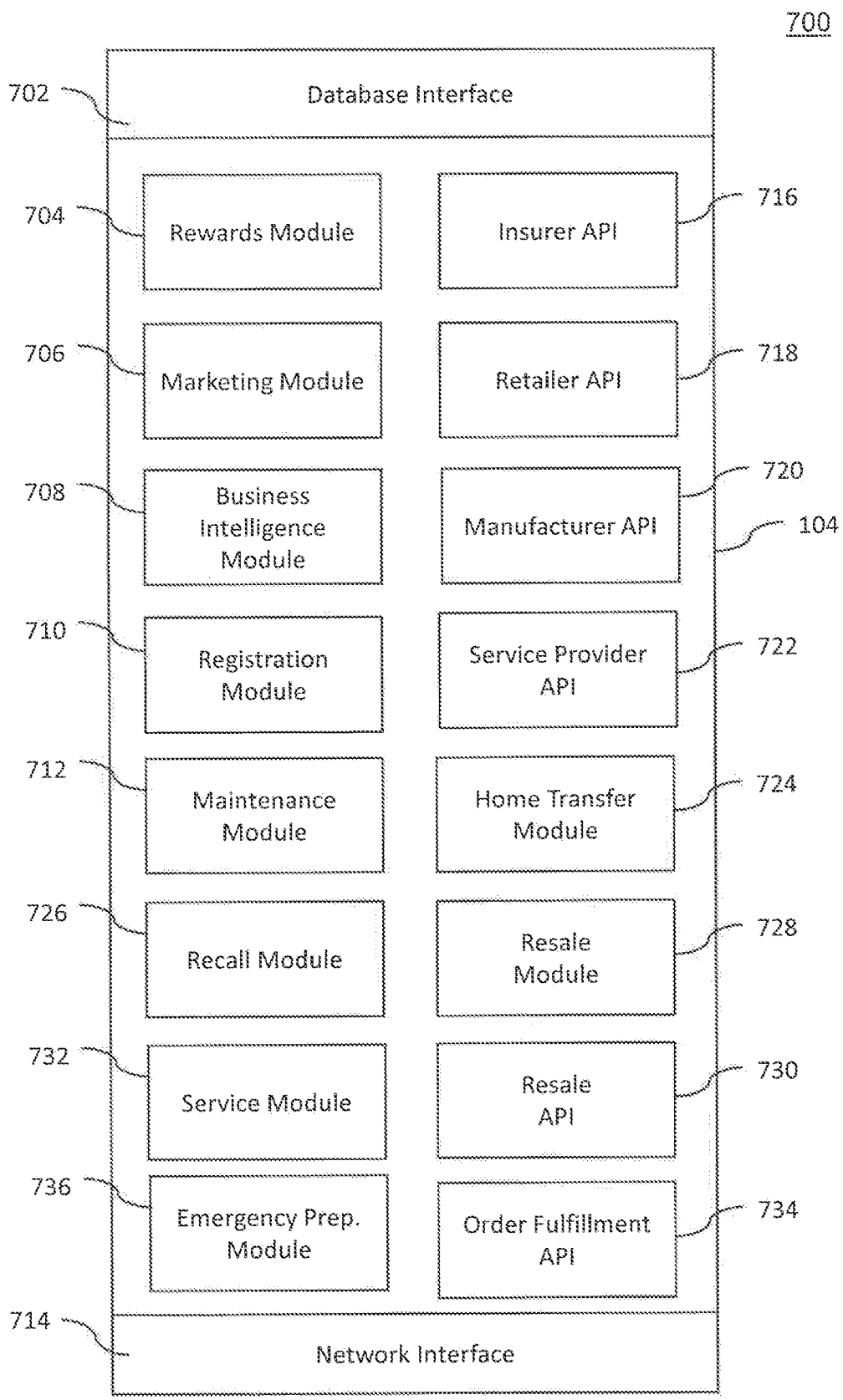
FIG. 7 illustrates a depiction of some components of a home asset management server according to one embodiment.

FIG. 7 illustrates some of the modules and APIs in an embodiment of home asset management server 104 of FIG. 1. All APIs and modules utilize the database interface 702 and network interface 714. Database interface 702 may be any kind of software or hardware interface to a database. As mentioned above, the term database as used herein refers to any method of storing data, including persistent relational data stores, persistent document stores, or any kind of non-persistent data store in memory. For example database interface 702 may be an object-relational mapping framework for interfacing to a relational database.

Network interface 714 is similarly any hardware or software interface to a network. The network may be any type of network capable of transmitting information either wired or wireless. For example the network may be the internet. Network interface 714 may he, for example, a TCP/IP software stack.

APIs 716-722 enable some of the data transfers described in relation to FIG. 2. APIs may be implemented in a programming language to transmit and receive information to various parties across the internet. Modules 704-712 may similarly be software modules implemented in a programming language to perform certain tasks. The various modules and APIs work together to enable communication between the various entities using the home asset management system as described below.

Maintenance modules 712 generates, tracks, and updates maintenance schedules and tasks for home assets. Once the Asset Model has been identified and its content matched, the system generates a maintenance schedule for the asset. A maintenance schedule is a list of dates or times and an action to be taken at that date or time. Maintenance schedules may include different types of schedule items. For example, a refrigerator asset may have a maintenance schedule item to replace the water filter every 6 months. A stone floor asset may have a maintenance schedule item to reseal the stone flooring surface flooring in the year 2018. Maintenance schedule items may repeat a set number of times, repeat indefinitely, or occur only once. Every maintenance action that needs to be taken for the asset is recorded along with its due date or time.

Each maintenance task is optionally linked to instructions from the manufacturer or a third party on how to perform the maintenance stored in the home asset content database. If parts or supplies are required, the product is presented alongside the task and available for one-tap purchase. This information may also be forwarded to a service provider via service provider API 722. Once tasks are complete, the user changes status to complete, triggering the countdown to the next time maintenance is due. If the user is participating in the property insurance discount program, they electronically sign the completion of the maintenance task as evidence of completion to the property insurer using insurance API 716. The system organizes insurance compliance tasks by insurer and sends, via API 716, the user account info, policy info and evidence of task completion (photo, digital signature) to the insurer, where the premium rebate or discount is processed.

When an asset is purchased or installed, the user can register it with the manufacturer using the system's "One-Tap Registration" feature of the registration module 710. By adding the asset, as explained above, the user is optionally presented with a "register this product" dialogue box. The user identifies the asset and takes a photograph of the receipt. The receipt is visually interpreted to extract the name, date and place of purchase. This data extraction, like asset nameplates, may be done via optical character recognition software or by manual means. The data set, comprised of the user name and address; asset model, serial number, age, and place and date of purchase is sent to the applicable manufacturer via manufacturer API 720. The user receives a notification, in the notification center, of any additional warranty or other communication offered by the manufacturer as received by manufacturer API 720.

Transfer of a home happens when one owner transfers ownership of the home to a new owner. The process surrounding home transfers is handled by home transfer module 724. At or around the time of transfer of the property, the new owner sets up the home asset management system for their home. During the initial setup the home transfer module 724 identifies an existing record for the property. Home transfer module 724 will identify which assets they acquired along with the property. By default all building systems, major appliances, and building materials will be indicated as transferred but the user may change that default. Once an asset is indicated as transferred along with the home it will be associated with the new owner's account. All associated asset service histories will accompany the asset record.

Transferred assets will appear along with all other assets in the new owner's account along with the asset history and associated content from the previous owner. If appropriate, the new owner will be prompted to re-register the asset with the asset's manufacturer. Re-registration makes use of the registration module 710 and manufacturer API 716. Re-registering will transmit relevant identifying information to the asset's manufacturer. Alternatively, the new owner may register assets for the first time when purchasing a new home using the registration module 710. Relevant information may include the new owner's user name, the home's address, asset model, asset serial number, asset age or purchase date, or original purchase receipt. In response the manufacturer may optionally present relevant incentives or opportunities to the new owner. Optionally one of these incentives may be reward points, as described below.

Recall module 726 handles recall notification from manufacturers. The home asset management system acts as a clearinghouse of recall data, connecting manufacturers with all user accounts associated with certain types of assets that are recalled by the manufacturer. Asset manufacturers may communicate recall notifications to the home asset management system by API 720 or by any other communication method. A recall notification may include any type of information to identify a group of affected assets. Such identifying information may include asset make, asset model, asset serial numbers or a range of serial numbers, specific production codes, or production dates or ranges of dates. Once the recall notification is received by the system a recall notification is sent to all accounts associated with affected assets. The notification may have a variable level of urgency from least to most urgent. In some embodiments, users may acknowledge receipt of the recall notification through an electronic signature. In other embodiments no acknowledgement is required. Included with any recall notification is the manufacturer's recommended action or an offer of repair or replacement.

Resale module 728 allows users to sell an asset in their account. The user may be presented with an option to sell any asset in their inventory. All relevant data about the asset stored in the user's inventory may be automatically populated in a sale posting. For example, the asset description, name, geography, and photos may be pre:-populated with information stored in the inventory database. The user may then optionally enter a price and a description of the asset in addition to the automatically populated information. The user may be presented with an evaluation function that will search online marketplaces for the same or similar assets and display an average price found. Any pre-populated information may also be over-written by the user. In addition, content from the asset manufacturer stored in the content database may also be included in the sale posting, including an official manufacturer image, specification, or links to content relevant to the asset. The asset management system then posts the sale posting to any number of online or offline marketplaces for sale. Such posting may be done manually or automatically through resale API 730. Examples of online marketplaces that the asset management system may post to include Craigslist®, eBay®, or NextDoor®, and any other online marketplace. A user of the client application may choose any number of marketplaces to post to.

One type of content that may be associated with an asset is emergency preparedness content handle by emergency preparedness module 736. Emergency preparedness content may include a family emergency plan, instructional videos, or other instructions or guidance to follow in the event of an emergency. Emergency preparedness content may be stored locally on a client device executing the client application so that it is accessible in the event of a communications outage. For example, in some emergencies network connectivity may be broken so that the client application cannot reach the servers. In that case the client application can still access locally stored content, including but not limited to content designated as emergency content. Examples of emergency content may include showing how to shut off the main gas valve to the specific property, or resetting the main electrical breaker (including how to find it) are stored locally and accessible under the emergency preparedness feature. This content may be generic and provided by an asset manufacturer or specific to the property such as a video of locating assets such as a gas valve or electrical junction in the user's home.

Some embodiments of the asset management system include features for allowing users to engage service providers to service their home assets by service provider API 722 and service module 732. The home asset management server includes a service providers database that includes listings for service professionals. Such listings may include contact information, user ratings, and experience information. Service provider experience information may include a history of that service provider's experience with the particular asset type, model, or category. For example, a service provider may have experience with a certain brand of dishwasher. Experience information may be presented to a user in a simplified fashion, such as a rating on a numerical scale, a star rating system, or a textual indicator of experience level such as "highly experienced" or "moderately experienced." This information is provided to the user along with the service provider's contact information.

The home asset management server may also search third party service provider brokers to present to users. Such third party service provider brokers include, for example, AngiesList® or RedBeacon®. Users may search for specific qualities or fields in the service provider database or be presented with a list of pre-selected options when the service provider functionalities are engaged. Service providers may be presented in the user interface ranked by location, availability, experience level, or any other field or data in the service provider database. Similarly, a user may filter the results by any of the same criteria, including location, availability, experience level, or any other field. Alternatively, the home asset management system may automatically select a service provider to present to the user based on available data. Service providers may also provide scheduling information to the home asset management server.

Scheduling information may then be displayed in their profile so that users may select a service provider that is able to conduct a service call at a particular time or time range.

When a user selects a service provider from the service provider database, the user may automatically send relevant information stored in their inventory related to an asset to the service provider. Such information may be transmitted to the service provider over any means of communication, including text message or email, or may be transmitted through the home asset management system to a specialized service provider application. Basic contact information may be provided to the service provider automatically based on the user's account. For example the service provider may be provided with the user's home address, name, and phone number automatically without requiring the user to enter it separately.

Providing the service provider with information such as asset make, model, serial number, service history, maintenance schedule, asset repair manuals, asset part numbers, or any other information stored in the home asset management system related to a particular asset allows the service provider to better prepare for the service call. For example, if a service provider knows a particular part or tool may be needed for a specific asset model, that service provider can Make sure to bring that part or tool, potentially saving a trip once the service call has begun. In addition, the user may generate content to share with the service provider relevant to the service call request. For example a user may create a video or image depicting a particular problem with an asset that can be then sent to the service provider in advance of a service call. For service tasks that are too small to require a service call, the user may aggregate many small tasks into one service call request. Small service call request tasks are tracked within the home asset management system for future service calls.

Service calls may be virtual or in-person. Virtual service calls may be synchronous or asynchronous via audio, video, or text communication with a service provider. Virtual service calls may occur within the home asset management system ecosystem or by other communication methods. For example, selecting to start a virtual service call with a service provider may begin a video communication between the service provider and the user within the home asset management client application. The service provider may use the same client application or a related service provider specific application to engage in video communication with the user. Similarly, the client application may initiate or otherwise engage other communication protocols or methods outside of the client application to communicate with the service provider. For example, the client application may present a phone number for the user to dial to call the service provider. Alternatively the client application may dial the number on the user's client device automatically. Text communication may occur within the client application with the service provider as well. Similarly, the client application may also engage other text communication methods to communicate with the service provider such as providing an email address for the user to communicate with the service provider. Any of the above communication methods may also be utilized to organize an in-person call where the service provider travels to the user's home to service an asset.

At the conclusion of a service call engagement the user may be provided with a feedback option to rate the service provider. Ratings may be in any format including text reviews, star rating systems, numerical rating systems, or any other rating methodology known to one or ordinary skill in the art. These ratings are then added to the service provider's entry in the service provider database and may contribute to the service provider's overall rating or score and may be viewable by other users. At the conclusion of a service call the user is also able to pay the service provider through the client application using any payment method including credit card payment, check payment, or payment by reward points. Payment information may be stored in the home asset management server for future use. Alternatively the user may arrange for payment to the service provider in a method not involving the client application and indicate so in the post-service call process.

The asset content database may include information regarding asset parts and supplies. Parts and supplies information may come from an asset manufacturer or from other sources including retailers or personal asset content. Parts and supplies information may include part numbers or SKUs or any other method of identifying parts or supplies. Examples of parts and supplies include replacement parts and consumable supplies such as a filter. A maintenance task may have an associated part or supply. For example the task "change the air filter in the HVAC system" is associated with a specific model and size of air filter. This supply information may be presented along with the maintenance task allowing the user to purchase the supply through the client application. The user may be presented with a single button to approve purchasing of the associated supplies for a task. The home asset management system then uses stored payment and shipping information to fulfill the supply order. Optionally the order information may also be forwarded to a third party for fulfillment. Forwarding may take place in any way of communicating order information including order fulfillment API 734. Order fulfillment API 734 may enable bi-directional communication to retailers enabling the user to track the order through the client application.

Manufacturer Business Intelligence Module 708 provides manufacturers, marketers, and retailers information about customer satisfaction and purchasing analytics. In the client application users are provided with an opportunity and incentive to periodically rate their satisfaction with a home asset. Ratings may be recorded by a numerical rating system, a star base rating system, or any other rating system. Users may rate overall satisfaction, their propensity to repurchase the asset, their propensity to recommend an asset or an asset brand to someone else, or any other metric that would provide valuable business intelligence to a home asset manufacturer. One example of business intelligence that a manufacturer may want to gather data for is a net promoter score. Users may be provided incentives to provide ratings by home asset manufacturers at various intervals based on the home asset type. Ratings may be private or public and may be made available to other users of the same or similar assets. Private ratings may still be shared with the home asset manufacturer. Rating data may be provided in an anonymized format to home asset manufacturers, such that the rating may not be linked, to a specific consumer. Ratings presented in this format may still have sonic level of identifying demographic information such as zip code or city but not specific as a street address, for example. Other identifying information presented to the home asset manufacturers may similarly be anonymized. Alternatively, users may elect to share more specific identifying information with manufacturers. Business intelligence data may be provided directly by the home asset server to manufacturers by manufacturer API 720 or through any other communication method.

Some embodiments include a marketing module 706 to allow home asset manufacturers to make offers available to users. Offers may also be made through other channel partners involved in the home asset supply chain such as retailers or distributers, included under the term manufacturers. Offers may be based on information in the home asset content database or the home asset inventory database and customized to the particular needs of a user. Offers may be either pushed from the manufacturer to the client or made available by the manufacturer and pulled by the client. Push offers may be displayed in a notification in the client application. Pull offers may be made available in the client application when a user searches for offers. Searching for offers may be based on asset type, asset model, asset category, asset manufacturer or brand, or any other type of information or specification identifying an asset. When a user pulls an offer, the user is able to request further information from the manufacturer or channel partner regarding that offer. At that point stored identifying information may be forwarded to the manufacturer or channel partner by retailer API 718. Push offers may be made through the Marketing module using information from the Business Intelligence module 708 targeting users based on any business intelligence data. Form this data a lead quality score may be assigned to a user, allowing manufacturers and channel partners the ability to identify the best leads available. Lead data may also be anonymized to any extent such that the user's privacy is protected until the user chooses to interact with the offer.

Some embodiments include rewards module 704. Rewards may be represented by points or other reward denominations. Rewards may be earned by users through a number of methods. Examples of actions that may earn rewards include contributing content to the home asset content database, answering questions other users have posted, or rewards may be transferred from one user to another. Alternatively reward points may be purchased by users. Rewards may be redeemed in the home asset management system for anything of value, including asset parts or supplies and service calls.

Figure 8:
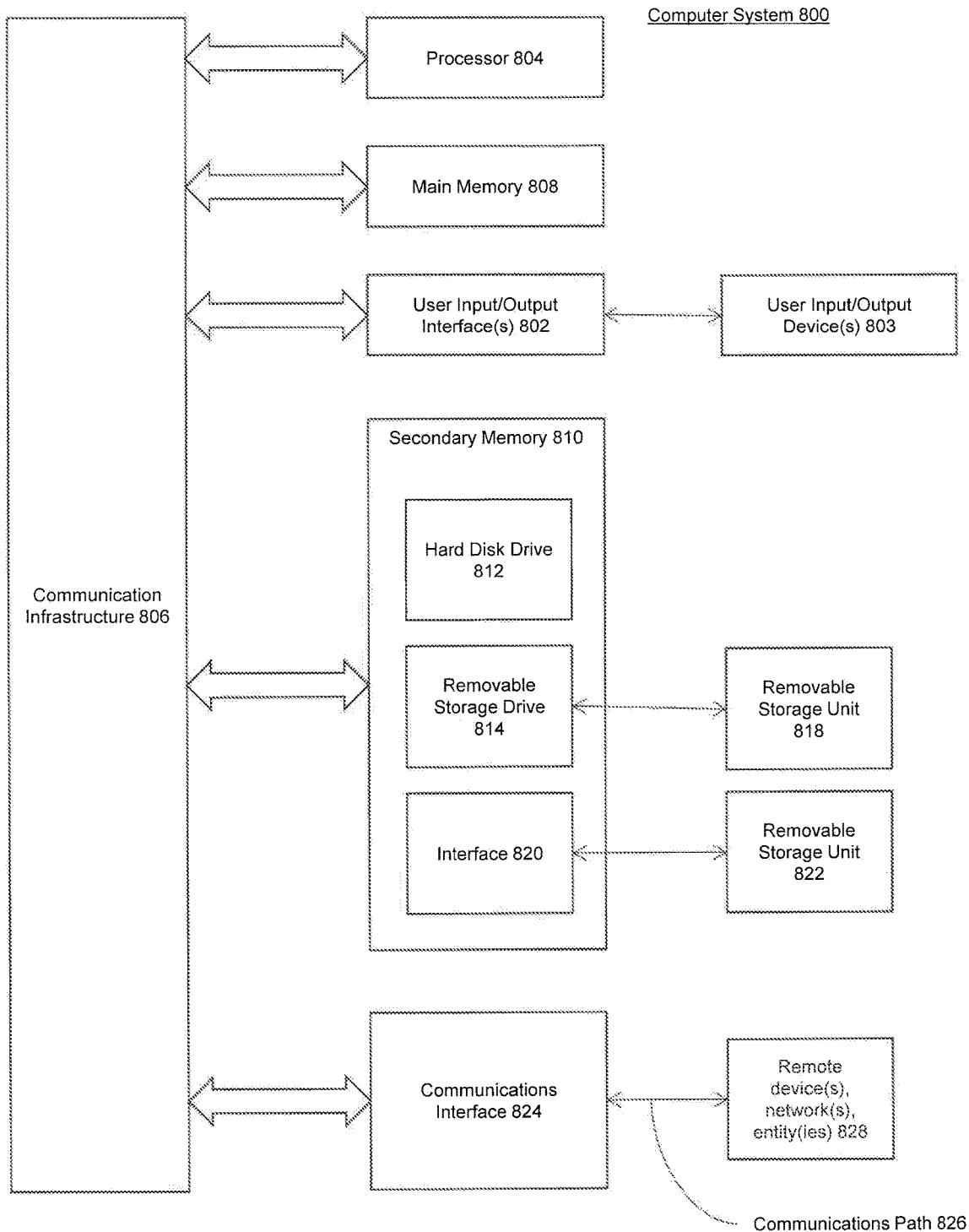
FIG. 8 illustrates an example computer system useful for implementing various embodiments.

Various embodiments can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated Memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

Figure 9:
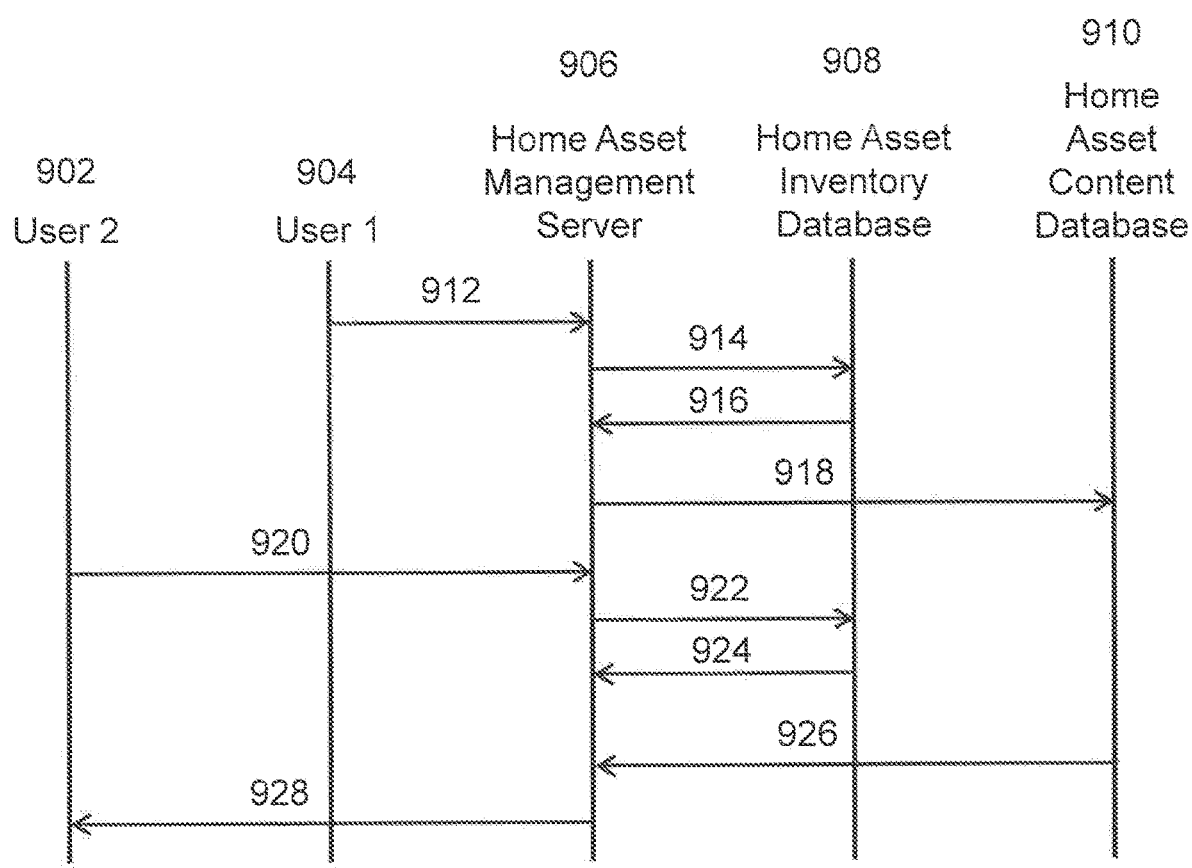
FIG. 9 illustrates the flow of data from one user to another user in an embodiment.

FIG. 9 illustrates the flow of content from one user to another user through a common association with an asset in an embodiment. In this example, User 1 904 sends content to Home Asset Management Server 906 in step 912. The content is related to a particular home asset. In step 914 and 916, Home Asset Management Server 906 locates the instance of the asset in the Home Asset Inventory Database 908 associated with User 1 904. Next, in step 918, Home Asset Management Server 906 stores the content received from User 1 904 in Home Asset Content Database 910 based on the instance found in Home Asset Inventory Database 908. After step 918, the content from User 1 904 is stored in Home Asset Content Database 910.

At some later time, User 2 902 makes a request to Home Asset Management Server 906 in step 920. User 2 902 is associated with an instance of the same asset that User 1 904 identified in step 912. In step 922 and 924, Home Asset Management Server 906 locates the instance of the asset in the Home Asset Inventory Database 908 associated with User 2 902. Next, in step 926, Home Asset Management Server 906 retrieves from Home Asset Content Database 910 content related to the asset, including the content provided by User 1 904 in step 912. Then the content is delivered to User 2 902 in step 928. Thus, the data path of content from User 1 904 to user 2 902 is complete. Any other user accessing an instance of the same asset will also receive any other content stored in Home Asset Content Database 910. As described above, such other content may come from other users, or various other sources as well.

Described above are systems, apparatuses, and methods to dynamically adjust message rates through a transport, and applications thereof. It is to be appreciated that the Detailed Description section, and not the Abstract, is intended to be used to interpret the claims. The Abstract may set forth one or more but not all exemplary embodiments of the present technology as contemplated by the inventors, and thus, is not intended to limit the claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the technology that others can, by applying knowledge within the skill of the art, readily modify or adapt for various applications such specific embodiments, without undue experimentation, without departing from the general concept of the present technology. Therefore, such adaptations and modifications are intended to be within the meaning and range of equivalents of the disclosed embodiments, based on the teaching a guidance presented herein. It is to be understood that the phraseology or terminology herein is for the purpose of description and not of limitation, such that the phraseology or terminology of the present specification is to be interpreted by a skilled artisan in light of the teachings and guidance.

The breadth and scope of the present technology should not be limited by any of the above-described exemplary embodiments, but should be defined only in accordance with the following claims and their equivalents.

What is claimed is:

1. An asset management system, comprising:
   an asset inventory database containing a first instance and a second instance of an asset definition, wherein the first instance and the second instance are data object instantiations of the asset definition, the first instance associated with a first account associated with a first property and the second instance associated with a second account, the first instance containing first asset content;
   an asset content database storing the first asset content and a reference from the asset definition to the first asset content; and
   an asset server configured to:
      establish a network connection with a client device corresponding to the second account;
      receive an image from the client device via the network connection, wherein the image includes asset identification data;
      extract the asset identification data from the image;
      identify the asset identification data as matching the asset definition;
      in response to the identifying:
         generate the second instance of the asset definition;
         associate the second instance with the second account and
         automatically transmit a subset of the first asset content to the client device due to the second instance corresponding to the second account having a data object instantiation relationship with the asset definition and wherein to automatically transmit the subset of the first asset content to the client device, the asset server is configured to:
            retrieve the first asset content from the asset content database based on the second instance being an instance of the asset definition;
            associate the first asset content with the second instance: and
            transmit the subset of the first asset content over the network connection to the client device.

2. The asset management system of claim 1, further comprising a registration module that registers the first asset account with a manufacturer associated with the asset definition when the first asset instance is instantiated in the asset inventory database.

3. The asset management system of claim 1, further comprising:
   a re-registration module;
   wherein when the first account transfers the first asset instance to a third account, the re- registration module re-registers the first asset instance with a manufacturer designated by the asset definition to the third account.

4. The asset management system of claim 1, further comprising an asset cataloging module that instantiates asset instances in the asset inventory database based on identifying information received from accounts.

5. The asset management system of claim 1, wherein the asset content database contains asset maintenance templates for each asset, and instance maintenance schedules are generated in asset instances based on the corresponding maintenance template in the asset inventory database upon instantiation, the instance maintenance schedules being editable by accounts.

6. The asset management system of claim 1, further comprising a manufacturer business intelligence module that provides business intelligence data to asset manufacturers based on data gathered from the asset inventory database and the asset content database.

7. The system of claim 1, wherein the asset server is further configured to:
   identify a first attribute of the asset identification data;
   identify a second attribute of second asset identification data, wherein the second attribute matches the first attribute; and provide the first asset content to a third asset account based on an association of the third asset account to a third asset instance, wherein the third asset instance corresponds to the second asset identification data.

8. The system of claim 1, wherein the asset server is further configured to store the first asset content in the asset content database in response to receiving a command to make the first asset content available to the public.

9. The asset management system of claim 1, wherein to extract the asset identification data, the asset server is further configured to:
apply an optical character recognition process to the image to extract the asset identification data.

10. The asset management system of claim 1, wherein the asset server is further configured to:
transmit the asset identification data to a manufacturer system indicated by the asset definition;
receive asset age data from the manufacturer system based on the asset identification data; and
update the second instance in the asset inventory database to include the asset age data.

11. The asset management system of claim 1, wherein to extract the asset identification data and to identify the asset identification data as matching the asset definition, the asset server is further configured to:
identify an asset model name, manufacturer name, or serial number from the asset identification data;
search the asset content database using the asset model name, manufacturer name, or serial number; and
identify the asset definition when at least one of the asset model name, manufacturer name, or serial number matches the asset definition.

12. A method of delivering content from a first client device corresponding to a first asset account to a second client device corresponding to a second asset account, the method comprising:
establishing a first network connection with the first client device;
receiving a first image from the first client device via the first network connection, wherein the first image includes first asset identification data;
extracting the first asset identification data from the first image;
identifying the first asset identification data as matching an asset definition;
in response to identifying the first asset identification data as matching the asset definition:
generating a first asset instance of the asset definition;
associating the first asset instance with the first asset account in an asset inventory database;
establishing a second network connection with the second client device;
receiving a second image from the second client device via the second network connection, wherein the second image includes second asset identification data;
extracting the second asset identification data from the second image;
identifying the second asset identification data as matching the asset definition;
in response to identifying the second asset identification data as matching the asset definition:
generating a second asset instance of the asset definition;
associating the second asset instance with the second asset account in the asset inventory database;
receiving first asset content from the first client device via the first network connection;
storing the first asset content in the first asset instance in the asset inventory database;
storing the first asset content in an asset content database;
generating a reference from the asset definition to the first asset content; and
automatically transmitting the first asset content to the second client device by an asset server due to the second asset instance corresponding to the second account having a data object instantiation relationship with the asset definition and wherein automatically transmitting the first asset content to the second client device comprises:
retrieving the first asset content from the asset content database based on the second asset instance being an instance of the asset definition;
associating the first asset content with the second asset instance; and
transmitting the first asset content over the network connection to the client device.

13. The method of claim 12, further comprising registering the first asset account with a manufacturer associated with the asset definition when the first asset instance is instantiated in the asset inventory database.

14. The method of claim 12, further comprising re-registering the first asset instance when the first account transfers the first asset instance to a third account by re-registering the first asset instance with a manufacturer designated by the asset definition to the third account.

15. The method of claim 12, further comprising instantiating asset instances in the asset inventory database based on identifying information received from accounts.

16. The method of claim 12, wherein the asset content database contains asset maintenance templates for each asset, and instance maintenance schedules are generated in asset instances based on the corresponding maintenance template in the asset inventory database upon instantiation, the instance maintenance schedules being editable by accounts.

17. The method of claim 12, wherein extracting the first asset identification data or the second asset identification data further comprises:
applying an optical character recognition process to the image to extract the asset identification data.

18. The method of claim 12, further comprising:
transmitting the second asset identification data to a manufacturer system indicated by the asset definition;
receiving asset age data from the manufacturer system based on the second asset identification data; and
updating the second instance in the asset inventory database to include the asset age data.

19. The method of claim 12, wherein extracting the second asset identification data and identifying the second asset identification data as matching the asset definition, further comprises:
identifying an asset model name, manufacturer name, or serial number from the second asset identification data;
searching the asset content database using the asset model name, manufacturer name, or serial number; and
identifying the asset definition when at least one of the asset model name, manufacturer name, or serial number matches the asset definition.

20. A non-transitory computer-readable device having instructions stored thereon that, when executed by at least one computing device, cause the at least one computing device to perform operations comprising:
establishing a first network connection with a first client device corresponding to a first asset account;

receiving a first image from the first client device via the first network connection, wherein the first image includes first asset identification data;

extracting the first asset identification data from the first image;

identifying the first asset identification data as matching an asset definition;

in response to identifying the first asset identification data as matching the asset definition:
- generating a first asset instance of the asset definition;
- associating the first asset instance with the first asset account in an asset inventory database;

establishing a second network connection with a second client device corresponding to a second asset account;

receiving a second image from the second client device via the second network connection, wherein the second image includes second asset identification data;

extracting the second asset identification data from the second image;

identifying the second asset identification data as matching the asset definition;

in response to identifying the second asset identification data as matching the asset definition:
- generating a second asset instance of the asset definition;
- associating the second asset instance with the second asset account in the asset inventory database;

receiving first asset content from the first client device via the first network connection;

storing the first asset content in the first asset instance in the asset inventory database;

storing the first asset content in an asset content database;

generating a reference from the asset definition to the first asset content; and automatically transmitting the first asset content to the second client device by an asset server due to the second asset instance corresponding to the second account having a data object instantiation relationship with the asset definition and wherein automatically transmitting the first asset content to the second client device comprises:
- retrieving the first asset content from the asset content database based on the second asset instance being an instance of the asset definition;
- associating the first asset content with the second asset instance; and
- transmitting the first asset content over the network connection to the client device.

* * * * *